(12) United States Patent
Wydroug et al.

(10) Patent No.: US 7,457,814 B2
(45) Date of Patent: Nov. 25, 2008

(54) MULTI-DIMENSIONAL DATA CLASSIFICATION FOR USER INTERFACE CUSTOMIZATIONS

(75) Inventors: Zoe M. Wydroug, Seattle, WA (US); Todd D. Ostermeier, Kenmore, WA (US); Nazar M. Abdelrahman, Redmond, WA (US); Christopher M. Tremonte, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 225 days.

(21) Appl. No.: 11/421,037

(22) Filed: May 30, 2006

(65) Prior Publication Data
US 2007/0282896 A1 Dec. 6, 2007

(51) Int. Cl.
G06F 17/30 (2006.01)

(52) U.S. Cl. ...................................................... 707/101
(58) Field of Classification Search ................ 707/2, 707/101; 709/203
See application file for complete search history.

(56) References Cited

U.S. PATENT DOCUMENTS

| | | | | |
|---|---|---|---|---|
| 6,122,658 | A | * | 9/2000 | Chaddha ...................... 709/203 |
| 2003/0004960 | A1 | * | 1/2003 | Pressmar ..................... 707/100 |

* cited by examiner

Primary Examiner—Etienne P LeRoux
(74) Attorney, Agent, or Firm—Lee & Hayes, PLLC

(57) ABSTRACT

A multidimensional data classification schema customizes user interfaces. Each user is assigned a context, and candidate objects for inclusion in a customized user interface are also assigned at least an attribute type of a context. Selection of objects for display is based on attribute types and associated attribute values assigned to an object and the attribute types and associated values of a user's context.

5 Claims, 8 Drawing Sheets

Fig. 5

| Context Specifier 424 | | |
|---|---|---|
| Context ID 506 | Attrib. Type 502 | Attribute ID 504 |
| 3 | Region | South |
| 3 | User Level | Deluxe |
| 3 | User Level | Standard |
| 3 | Language | English |
| 3 | Version | 2.1 |
| 3 | Version | 2.2 |
| 3 | Version | 3.0 |
| 3 | Product | Product "X" |
| *(Wildcard) | Generic Attribute Type | *(Wildcard) |
| ... | ... | ... |

↑ 508
↑ 510
↑ 512
↑ 514
↑ 516
↑ 518

MULTI-DIMENSIONAL DATA CLASSIFICATION FOR USER INTERFACE CUSTOMIZATIONS

TECHNICAL FIELD

The subject matter relates generally to computing systems and more specifically to multi-dimensional data classification for user interface customizations.

BACKGROUND

Services for computing systems, such as subscription services available over the Internet, often cater to a wide audience of users via a user interface (UI). Each service typically sends data content to various users, including instructions for various products, help menus, pull-down menus, toolbars, etc. Users have very different needs, however, so a single version of any one UI configuration or data content is not likely to satisfy all users.

FIG. 1 shows a conventional scheme 100 for creating a number of monolithic user interfaces. Users 102 are roughly categorized into groups and each group provided with a monolithic UI that best approximates the group's characteristics and needs. The groups, however, are usually formed according to a single criterion—along one dimension—such as geographical region, with an assumption that the characteristics and needs of users that match the criterion in one dimension will be similar. Thus, users designated as "West Coast" are provided a UI version 104 that is assumed to meet the needs of a typical West Coast user. East Coast, North, South, and Midwest users are also provided with a version of the UI (106, 108, 110, 112, respectively) thought to best satisfy users 102 in these regions. If a second dimension is added, such as "product type," e.g., for three different products, then in the monolithic model nine more UIs are needed, for each product, three more UIs for each geographical version of the UI (West Coast UI 104, East Coast UI 106, etc.).

This conventional scheme 100 for tailoring UIs and their content to users 102 has several more disadvantages. A certain data object 114 may be identical across UI versions or designed for use as a section of unchanging boilerplate across all versions of a monolithic UI. Thus, the data object 114 may be relatively unchanging even if the data object 114 appears in different positions within multiple UI versions (i.e., object versions 114, 116', 116'', 116''', 116''''). Such a data object 114 often has to be rewritten and stored anew for each monolithic UI version even though different instances of the data object 114 are identical or nearly identical in each version.

Data objects that do change significantly across different UI versions also have to be rewritten for each version. For example, data objects 116 and 118 may change across multiple UI versions (not shown), incurring significant effort when these data objects 116, 118 are large text corpora. So, one of the problems with conventional UIs is that they are often written as seamless wholes that require unique modification during update other versions of the UI also require their own separate update. Such conventional UIs may be very large objects in which various parts are hard coded into a given version.

Customer support tools provide one conventional example of the monolithic UI approach. Conventionally, UI customization for customer support tools is hierarchically dispatched along one dimension—a single group dimension, as described above. A group object is defined in order to consolidate a set of tools for users and data items that users can access via the UI, such as mailboxes, issue codes, flags, etc. This conventional scheme, however, is rigid because it does not allow objects to be shared across groups and requires duplicate objects to be created in each group where such objects are needed. For example, if the customer support tools use an "issue code" entity, then for each group, separate instances of an issue code connectivity tree are defined. These separate instances of a tree are more or less self-contained and have no common interaction. This means that the conventional scheme does not allow one part of a tree (e.g., the top level, or one branch, or one subset, etc.) to be shared between trees. If parts of the tree could be shared or made common, then the sharing would allow corresponding instances of the part to be updated across multiple trees just by updating one instance; would avoid constantly having to reproduce the same part; and would avoid the effort of reporting separately on different instances of the same part. Thus, although each group in this conventional scheme example has a connectivity issue code tree, the replicated tree is actually defined multiple times, and the multiple trees have no common or shared parts. So, each corresponding part has to be maintained separately and reported on separately.

Additionally, customization of customer support tools along one-dimensional groups does not allow a sufficiently granular adaptation of a given UI to different users—a user is subjected to an "all or nothing" model in which unneeded tools are offered or needed tools are lacking. The one-dimensionality of groups, and in turn UI customizations, also results in an explosion in the number of groups created and maintained to address the different customization requirements of customer support agents based on vendor site, country, locale, line of business, level, etc. In some instances, the motivation driving the multiplication of separate groups includes a desire to avoid a confusing abundance of unneeded options. If only a few large groups are used, there is the disadvantage that each group tries to serve too many different types of users. The explosion of groups can also be motivated by a desire to avoid potential security holes that are possible if a user has access to more information than needed in a monolithic group meant for too many different types of users.

Because of this, there is a need to more accurately customize UIs to the multiple characteristics and needs of various types of users and at the same time streamline the UI generation process.

SUMMARY

A multidimensional data classification schema customizes user interfaces. In one implementation, various contexts for assembling versions of a customized user interface are established. Each context may have a variable number of dimensions, and each dimension includes an attribute type that is capable of being associated with one or more corresponding values. Each user is assigned a context, and candidate objects for inclusion in a customized user interface are also assigned at least an attribute type of a context. Various types of filtering and selection logic may be applied in order to select objects for display, using a comparison between attribute types and values assigned to an object and the attribute types and values of a user's context. In one implementation, performance is increased by batching objects associated with each dimension of a context in prearranged queues prior to UI customization. Wildcard attribute types that have no assigned attribute values may also be used. A wildcard attribute type allows an object possessing the wildcard to be accepted for inclusion in a customized UI even though the current user may have a value specified for the corresponding attribute type.

BRIEF DESCRIPTION OF THE DRAWINGS

FIG. 5 is a diagram of an exemplary context specifier.

DETAILED DESCRIPTION

Overview

Software applications often lack customization to a particular user, an operation being performed, or specific data being processed. Systems, engines, data structures, and methods are described herein for defining users, operations, and data according to multi-dimensional classification schemata and for customizing a user interface (UI) accordingly.

In one implementation, instead of creating a conventional one-dimensional set of groups, an exemplary multi-dimensional data classification schema allows a variable number of dimensions to be defined into a context for matching a user with objects to be arranged as a custom tailored UI for the user. Attributes are assigned to a user from the multiple defined dimensions, such as vendor site, country, line of business, etc. Objects capable of participating in UI customization are also assigned appropriate attributes and can be used across multiple customized UIs without a need to duplicate such objects.

In one implementation, upon a user's login to an application, those objects matching the user's attributes along all assigned dimensions are shown to the user. Resulting reduction in object duplication greatly reduces administrative burden within the system and provides a mechanism for unified reporting on the non-duplicated data.

Figure 1:
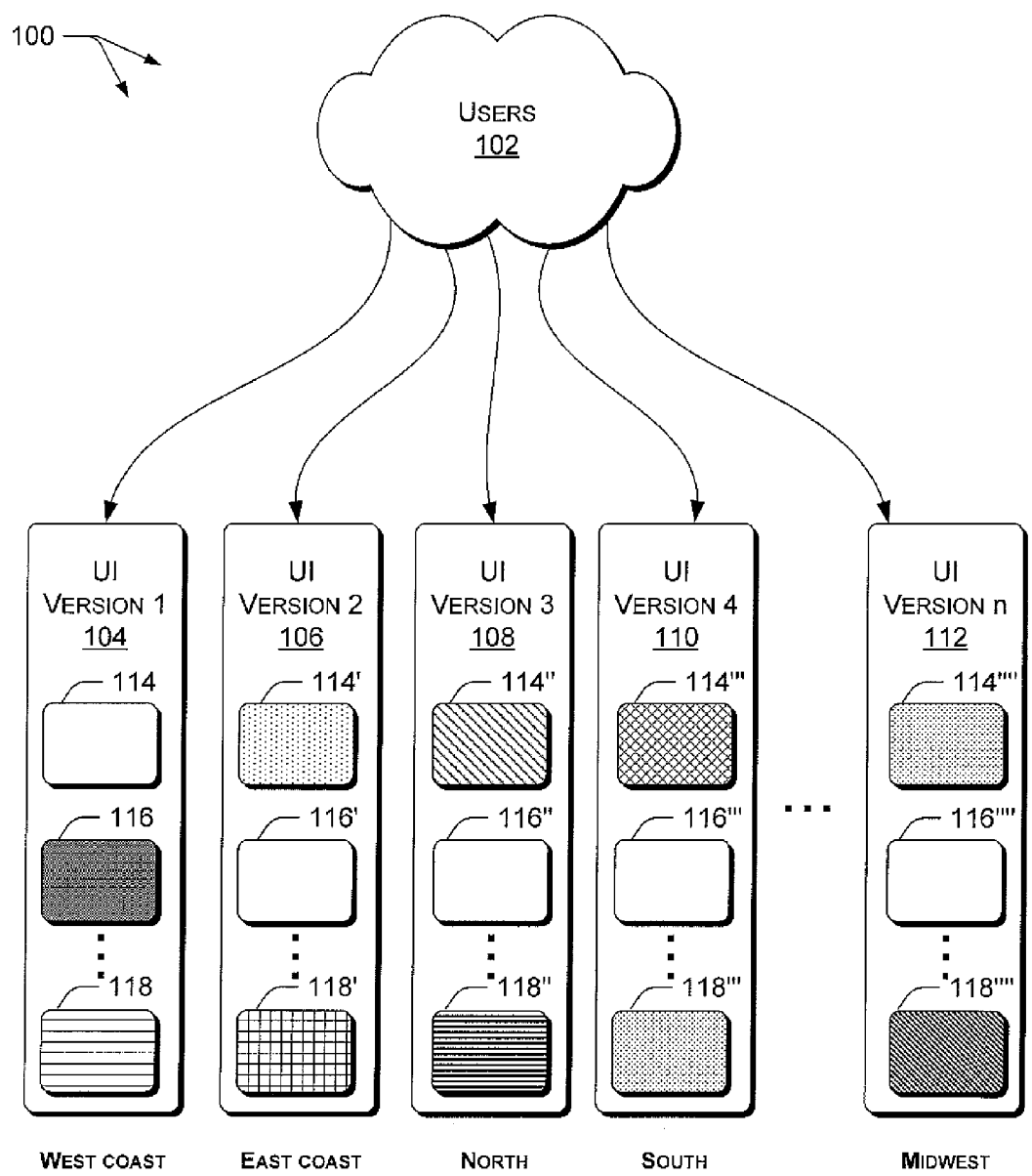
FIG. 1 is a diagram of a conventional system for customizing user interfaces.
Figure 2:
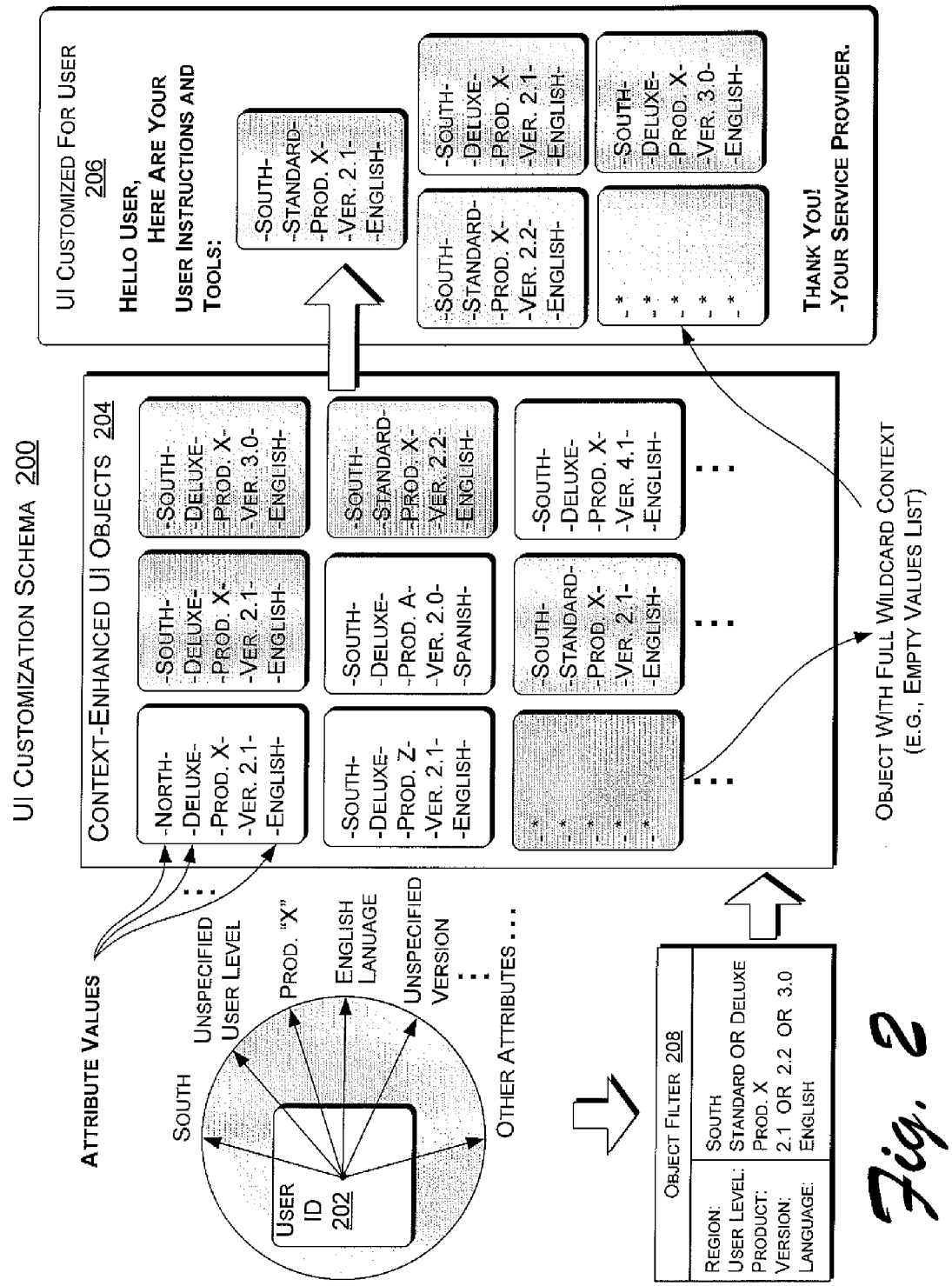
FIG. 2 is a diagram of an exemplary schema for customizing user interfaces.

FIG. 2 shows several aspects of an exemplary UI customization schema 200. A user, e.g., as represented by a user ID, ("user") 202, is defined with respect to multiple dimensions. The attribute types of the selected multiple dimensions establish a context that can be used to index and/or filter candidate UI objects 204, that is, to select objects to create a UI that is customized to the particular user, a "customized UI" 206.

A variable number of dimensions may be selected for the exemplary multi-dimensional classification of the user 202. Dimensions may include, for example, geographical region, level of user (standard, premium, deluxe, etc.), product type, product version, language, etc. Of course, many other types of dimensions with their respective attributes may be selected.

The dimensions selected to multi-dimensionally classify a user 202 or an object 204 can have relationships and dependencies between themselves, for example, a child/parent relationship. In such an implementation, a context is more than just a collection of attribute values for the attribute types making up the context. An attribute value for a parent attribute type may have a bearing on what attribute values are allowable for a child attribute type. For example, attribute values allowable for a "software version" child attribute type may be dependent on the attribute value of a "product" parent attribute type. Such a relationship between the attribute values in a context may have to be declared and/or established before the context containing the relationship is considered valid for use in an exemplary system.

To actuate a customized UI 206, an object filter 208 may be used to select which candidate UI objects 204 are suited to the user's context. An object filter 208 may use a context specifier that typically includes attribute types describing the context dimensions and associated allowable attribute values. In one implementation, the object filter 208 results in selection of objects that align with all the attributes in the user's context for display in the customized UI 206. A template for arranging objects in a particular customized UI presentation may itself be one of the objects.

In the illustrated example of a UI customization schema 200, those objects that have allowable attribute values and match attribute type/value pairs of the user's context will be included in the customized UI 206. Thus, the customized UI 206 to be displayed for the user 202 has exclusively those objects 204 that have the attribute values: "south" for the "region" attribute type, either "standard" or "deluxe" for the unspecified "user level" attribute type, "product X" for the "product" attribute type, version "2.1" or "2.2" or "3.0" for the unspecified "version" attribute type; and "English" for the "language" attribute type.

It should be noted that in this type of implementation, there may be multiple values provided for each attribute type, any of which can qualify an object to be included in the user's customized UI 206, if the user's context allows. Or, if no attribute values are specified for an attribute type in the user's context, then any allowable attribute value for that dimension of the user's context results in a "match" in which the object gets included in the user's customized UI 206.

In other implementations, different logic than that described immediately above may be used to match candidate UI objects 204 with a user's context. For example, in one implementation, an object that has even one attribute in common with the user's context may meet a criterion for inclusion of the object in a customized UI 206.

In the implementation illustrated in FIG. 2, more than one aspect of customization logic may include a "wildcard" aspect. That is, if the object filter 208 does not designate any attribute values for a given attribute type, then an object 204 that meets the other context specification criteria (i.e., has acceptable attribute values for the other attribute types being sifted by the object filter 208) may be selected for inclusion in the customized UI 206. Or, a context assigned to a UI object may include one or more wildcard attribute types that have no associated attribute values. For example, an object may have a full wildcard context that has no attribute values listed and therefore matches any other context in an exemplary system. Those of skill in the art will appreciate that many other Boolean logic techniques and other inclusion/exclusion filters may be applied in order to select candidate UI objects 204 based on the context possessed by a given user 202.

Exemplary System

Figure 3:
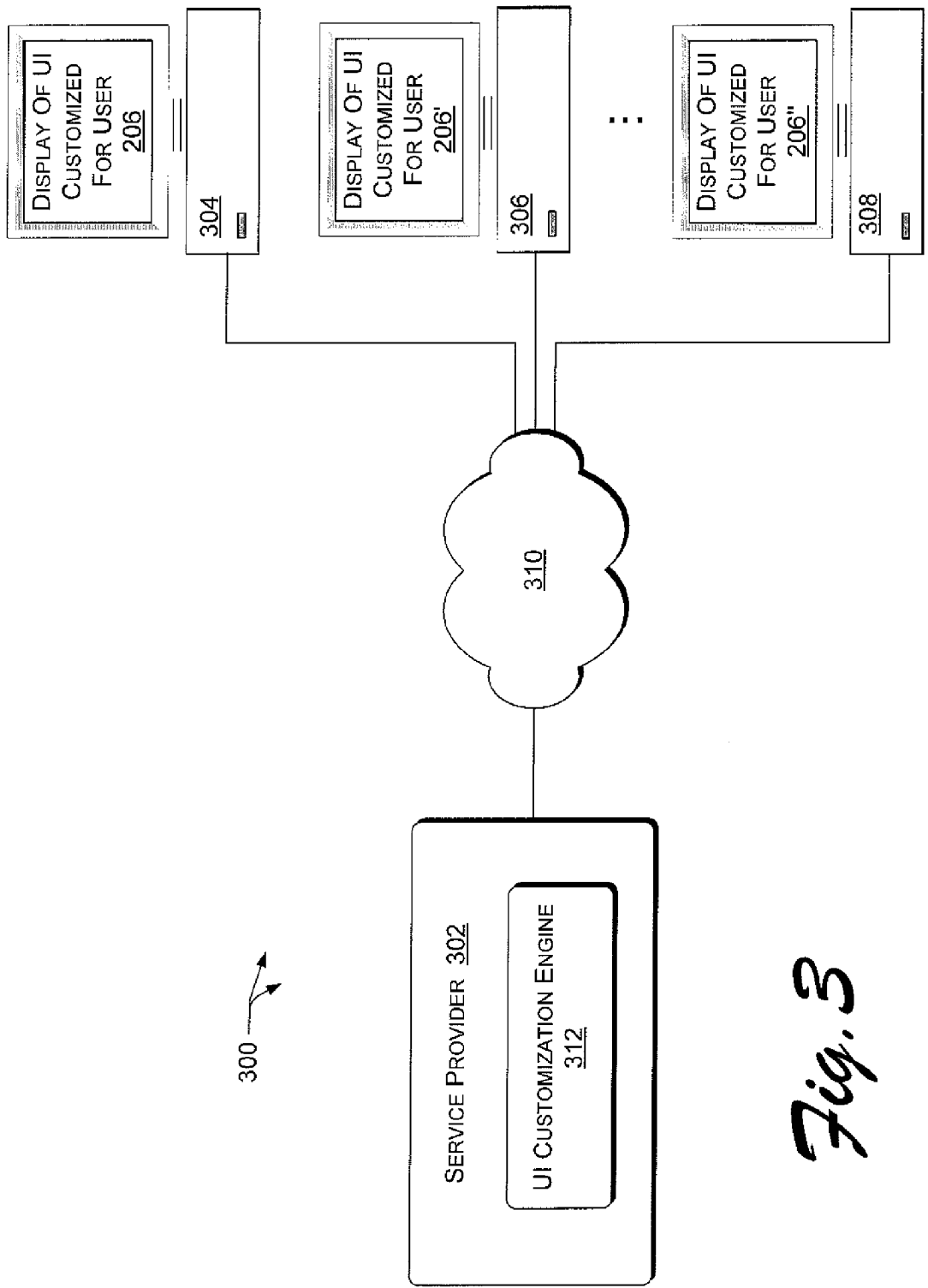
FIG. 3 is a block diagram of an exemplary system for customizing user interfaces.

FIG. 3 shows an exemplary system 300 that provides an example environment for performing multi-dimensional data classification for UI customizations. A service provider 302 provides content to users (304, 306, . . . 308) via a network, such as the Internet 310. An exemplary UI customization engine 312 classifies users and content by contexts according to an exemplary UI customization schema, such as that described with respect to FIG. 2. When requested to send content to a user, the UI customization engine 312 also reads the user's context and filters objects to send to the user's customized UI 206.

In the illustrated system 300, the UI customization engine 312 is shown included in the service provider 302. However, the UI customization engine 312 may be located elsewhere or split into components in multiple locations. For example, agents that perform object filtering may be located with users (e.g., 304) or may be located at an intermediate point in a network 310.

Exemplary Engine

Figure 4:
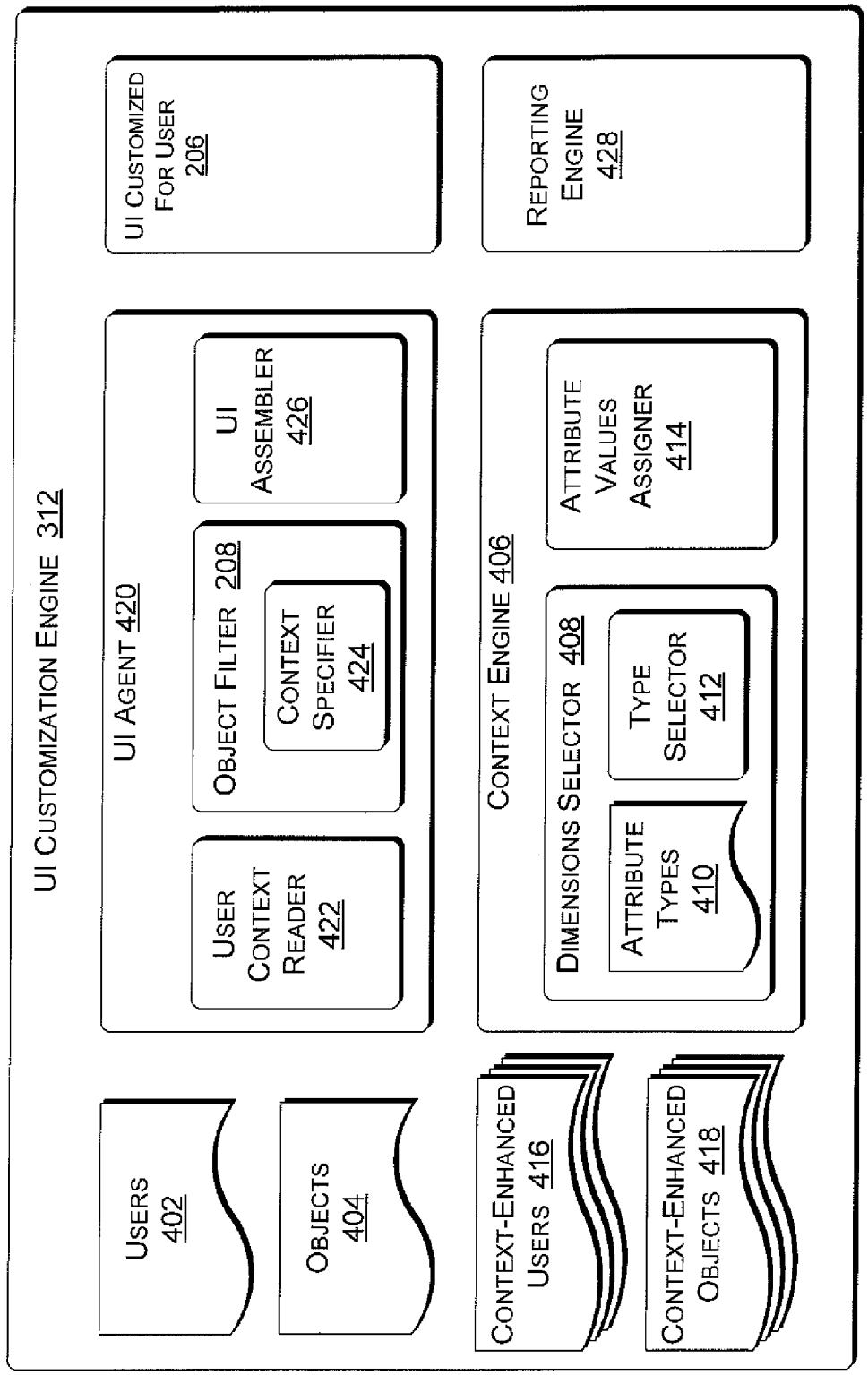
FIG. 4 is a block diagram of an exemplary user interface customization engine.

FIG. 4 shows exemplary components of the UI customization engine 312 introduced in FIG. 3. The illustrated UI customization engine 312 provides one example arrangement. Many other arrangements of the illustrated components, or similar components, are also possible. It should be noted that an exemplary UI customization engine 312 can be executed in hardware, software, or combinations of hardware, software, firmware, etc.

A database of users 402 stores identities, such as subscriber identities, of those who receive content to be displayed in a UI, e.g., from a service provider 302. A database of objects 404 can store undimensioned content objects.

In order to create multi-dimensional classifications, i.e., contexts, useful for customizing UIs, a context engine 406 classifies a user 402 along multiple dimensions according to attributes of users 402 or other attributes. Since a context is a multidimensional classification of a user 402 or an object 404 by attributes—i.e., a set of attribute types and their allowed values, a dimensions selector 408 decides how many dimension to use for a classifying one or more users 402 (or objects). Not only can a dimension of a context be an attribute type/attribute value pair, but one dimension of a first context can be a second context, that is, a context within a context. The attribute types of a context may also have a hierarchical relationship to each other, for example, the attribute types of a context can be, and often are, different parts of a relational tree. A certain product, for instance, may have a platform type and version number. The dimensioning of a context for a user 402 according to these attribute types may form parts of a rudimentary relational tree. This type of structure among attribute types of a context enhances reporting and auditing, as discussed further below.

The number of dimensions to be used in classifying users 402 may depend on the number of users 402 and diversity of attribute types among the users 402. If the entire collection of users 402 is very homogenous, then the dimensions selector 408 may select only a minimum number of dimensions for customizing UIs since customization is likely to be minimal. To add or subtract a dimension to a classification schema, the dimensions selector 408 may include a list of attribute types 410 and a type selector 412.

To create a specific context for a user 402 or for an object 404, the context engine 406 includes an attribute values assigner 414. For a given user 402 or object 404, the values assigner 414 determines which value(s) of attribute types will be used as match criteria, which when present in an object, qualify the object to appear in a customized UI 206.

The number of attribute values assigned to an attribute type can vary. If only one attribute value is assigned to an attribute type of an object 204, then in one implementation, the object will appear only in the customized UIs 206 of users 402 possessing the same value for that attribute type, if the object appears at all (inclusion in a customized UI may depend on other attribute values of other attribute types in the context). If multiple attribute values are assigned to an attribute type of an object 204, then the object will appear in the customized UIs 206 of users 402 possessing one or more of the assigned attribute values. In one implementation, if an attribute type of an object 204 is set to "wildcard"—i.e., no attribute values set for the wildcard attribute type—then the object 204 will match any user 402, as to that attribute type.

It should be noted that not every object in a customized UI 206 has to be dimensioned by the context engine 406 and stored in a database of context-enhanced objects 418. Some objects can be displayed in a customized UI 206 by other processes, or be allowed as standard objects to be included in any version of a UI, without detracting from the customization implemented by the subject matter.

In one implementation, the attribute values assigner 414 may populate an attribute type of an object with multiple values. If the attribute type is "region," for example, then an object may be assigned "west," "north," and "east." Then, a user 402 from any of these three regions can be provided with the object 404. After attribute types and values have been assigned to contexts, users 402, and objects 404, the dimensioned users and objects may be stored in a database of context-enhanced users 416 and a database of context-enhanced objects 418.

In one implementation, a UI agent 420 provides the bridge between context-enhanced users 416 and their customized UIs 206. A user context reader 422 determines a user's context, e.g., a context ID, for selecting and/or filtering context-enhanced objects 418. The user context may be stored as a relatively unique set of attribute types and values for a particular user, or the user context may be common to many users 402 and represented by a common identifier that is stored, e.g., in a table that relates the identifier to various attribute types and values characteristic of the context.

Once the user context reader 422 determines a context, an object filter 208 selects which context-enhanced objects 418 match the context. In one implementation, the object filter 208 includes a context specifier 424 that performs a filtering function, logical selection, or other relation between context-enhanced users 416 and context-enhanced objects 418. An exemplary context specifier 424 will be discussed in greater detail below with respect to FIG. 5.

A UI assembler 426 performs any associations that may be needed to create a customized UI 206 from the selected/filtered objects specified by the object filter 208. For example, one or more of the context-enhanced objects 418 specified for a given context may be a template for a customized UI 206 for that context. The UI assembler 426 then populates the template with other context-enhanced objects 418 specified by the object filter 208.

A reporting engine 428 allows administrative querying of an exemplary system 300. An administrator wishing to query via the reporting engine 428 can get a report according to attribute, e.g., can aggregate a report across attribute types or attribute values. In contrast, conventional reporting of an attribute across monolithic UIs (e.g., 104, 106, etc.) required repeating the query for each monolithic UI, since there is no cross sharing of attributes across conventional versions of a UI. An exemplary reporting engine 428 can report on an entire context or can create a more granular view by drilling down using the context attributes. For example, if an attribute type is geographical region, the reporting engine 428 can produce a global report with respect to all geographical regions considered, or can create a report of a single given region.

The flexibility of an exemplary system also makes it easy to aggregate administrative tasks (e.g., adding, removing, and updating objects) across attribute types. For example, a context that is relevant to many types of objects may be modified in a context specifier 424 by adding or subtracting attribute types 502, changing attribute values 504, or by changing the relation between an attribute type/value pair and a context ID 506. The subject matter makes it easy to administrate contexts and to perform a host of other administrative tasks that globally affect or define the objects and relationships used to match users with objects making up a customized UI for each user.

FIG. 5 shows an exemplary context specifier 424 of FIG. 4 in greater detail. A context specifier 424 relates a context, e.g., as read by the user context reader 422, to the attribute types and attribute values of the dimensions making up the context. p context specifier 424 can function bidirectionally, the direction of association depending on the implementation. For example, if a given implementation uses a limited number of well-defined contexts, each represented by an identifier (ID), then upon receiving a user's context ID each dimension of that context can be identified by the context specifier 424 for purposes of selecting UI objects. On the other hand, if an implementation allows users to have a wide spectrum of attribute types and values, that is, numerous user contexts are used, then a context specifier 424 may be used to relate a user's many attribute types and values to a context ID recognized across the system.

In the illustrated context specifier 424, each pair consisting of an attribute type 510 and an associated attribute value 504 is associated with a context 506, in the illustrated case the context has the identifier "3." When the user context reader 422 passes a user's context of "3" to the object filter 208, then each attribute type/value pair specified in the context specifier 424 is selected as a criterion for filtering the context-enhanced objects 418. If the attribute type 502, such as "user level" has multiple attribute values 504 assigned, then context-enhanced objects 418 that possess either of the attribute values 504, such as "deluxe user" or "standard user" may qualify an object to be included in a customized UI 206, depending on the user's context. In other words, an attribute type 502 describing a dimension of a given context may have multiple entries in the context specifier 424 (e.g., 508 and 510 are multiple values of the "user level" attribute type; 512, 514 and 516 are multiple values of the "version" attribute type).

Depending on filtering logic incorporated into an object filter 208, a generic attribute type with no attribute values specified, e.g., a wildcard attribute type/value pair 518, can either be used as a wildcard or as a blocking agent. The wildcard attribute type/value pair 518 can be attached to a given context, or can be made a universal wildcard pair 518 as to any current context as well as to the attribute type described by the pair 518. If a wildcard pair 518 is used, then an object with the wildcard attribute type qualifies for inclusion in a customized UI 206 regardless of the user's attribute value for the wildcard attribute type (assuming the object meets other selection criteria according to user context). In other words, an object's attribute value 504 for a wildcard attribute type 502 does not prevent the object from being selected for the customized UI 206 being assembled. If, on the other hand, a wildcard attribute type is used with blocking logic or as a blocking agent, for example in a context specifier 424, then in one example, an object that does not possess a value for the wildcard attribute type is prevented from being included in the customized UI 206 being assembled.

As mentioned above with respect to FIG. 4, it is easy to modify a context by adding or subtracting attribute types 502, changing attribute values 504, or by changing the relation of an attribute type/value pair to a context ID 506 in a context specifier 424. The subject matter makes it easy to administrate contexts and to perform a host of other administrative tasks that globally affect or define the relationships between users and objects to be displayed in a custom UI for each user.

Exemplary Data Structures

Figure 6:
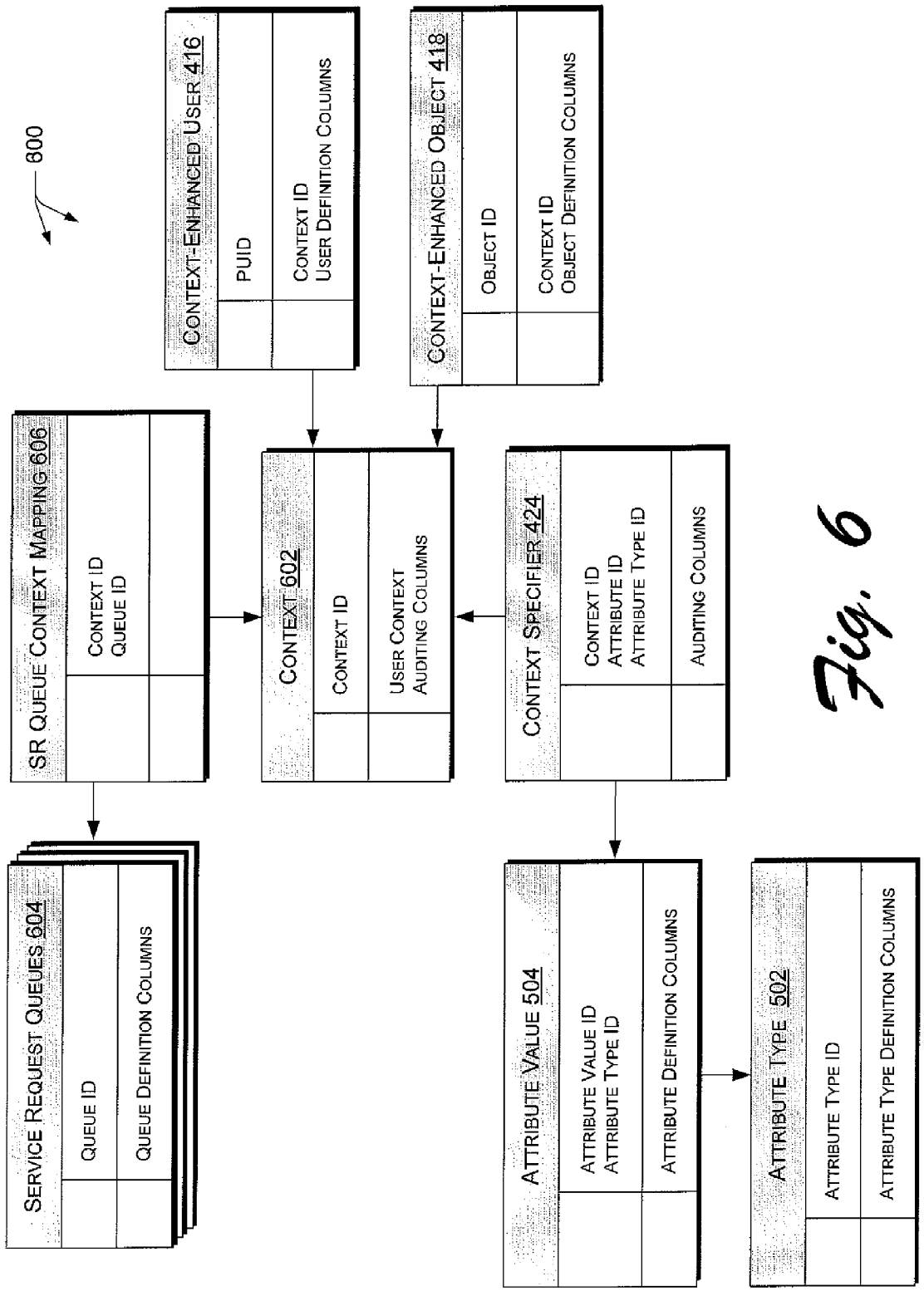
FIG. 6 is a class diagram of an exemplary database structure for user interface customization.

FIG. 6 shows a class diagram depicting an exemplary database structure 600 for multi-dimensional data classification associated with UI customizations. The illustrated structure 600 can be implemented as one of many database schemata. For example, the illustrated structure 600 can be implemented as a SQL library (a set of functions or user-defined functions and procedures) that manage a multi-dimensional classification, i.e., a context. A set of administrative application program interfaces (APIs) can be employed to manage contexts and context-enhanced objects 418. In one implementation, there are also mechanisms to transmit context-enhanced objects 418 using files cached on a client.

In one implementation, an exemplary database structure 600 consists of several tables. A context table 602 enumerates distinct contexts in an exemplary system. Contexts can be created on demand and purged as they become unreferenced. Contexts are defined by a context specifier 424 (table) that contains specific attribute type/value pairs defining a context from an attribute type table 502 and an attribute value table 504. Context-enhanced objects 418 can include a context ID in their definition in order to reference a given context in the context table 602.

In one implementation, one or more service request queues 604 have only one attribute value for each context attribute type, because each service request queue 604 obtains specific objects to be actualized in a customized UI 206 for one dimension of a user context. The service request queue 604 is used as a meeting point between the context-enhanced user (e.g., 416) whose UI is to be customized and the objects (e.g., 418) that are to be displayed in the customized UI 206. That is, in one implementation, a context mapping table, such as the illustrated service request queue context mapping table 606, resolves each user's context to a set of intermediate objects, such as service request queues 604 that each include a list of service requests that are in scope for one dimension of the user's context. Once the user's context is matched with a given service request queue 604, the objects accessible from that queue 604 are determined by matching the context of the queue 604 to the context of objects (e.g., 418) and displaying the objects to the user. Multi-dimensional mappings can be composed, allowing daisy-chaining of multi-dimensional object mappings.

In an implementation that uses a SQL server, the SQL context-matching operations can be performed on the SQL server using a SQL library that supports operations, such as the example operations listed in Table (1):

TABLE (1)

| | |
|---|---|
| Add A Context | If a context already exists, its identity is returned, otherwise a new context object is inserted into the database |
| Get A Context Specification | Attributes for a given context ID are returned |
| Get Service Request Queues That Match A Context | Resolve a full context to a set of service request queues |

TABLE (1)-continued

| | |
|---|---|
| Get Contexts Matching A Service Request Queue | Get a list of context IDs that are applicable to a service request queue |
| Get Contexts Matching Context ID | Get a list of contexts that are applicable to a full context ID |
| Get Contexts Matching A Context | Get a list of contexts that match a full context |
| Is Equal Or Narrower Context | Determines if a context is a subset of another context |
| Purge Inactive Contexts | Removes contexts that are not referenced in the system |
| Validate Context | Boolean function that validates values in a context |

In one implementation, most of the context operations are performed on a SQL server, to assist performance. In order to ease the burden of data matching on a UI application or component, such as UI assembler 426, there may be a batch agent on the server that determines all distinct contexts for users of the system and pre-generates, for example, XML files containing all content-enhanced objects 418 for each one of the contexts. Instead of passing in the context of each data object to a client, the batch agent resolves the user's context to a set of service request queues 604. When a UI assembler 426 launches, it determines the logged-in user's context and retrieves appropriate data files. After receiving these files, the UI assembler 426 organizes the data in memory to be searched easily. Workflows can be streamlined and kept reasonable by use of the service request queues 604. These limit the current working context to those service queues 604 that match the user's context. Once a service request queue 604 is selected, the objects 418 applicable to that queue 604 will be visible to the context-enhanced user 416 without further intensive computation.

Figure 7:
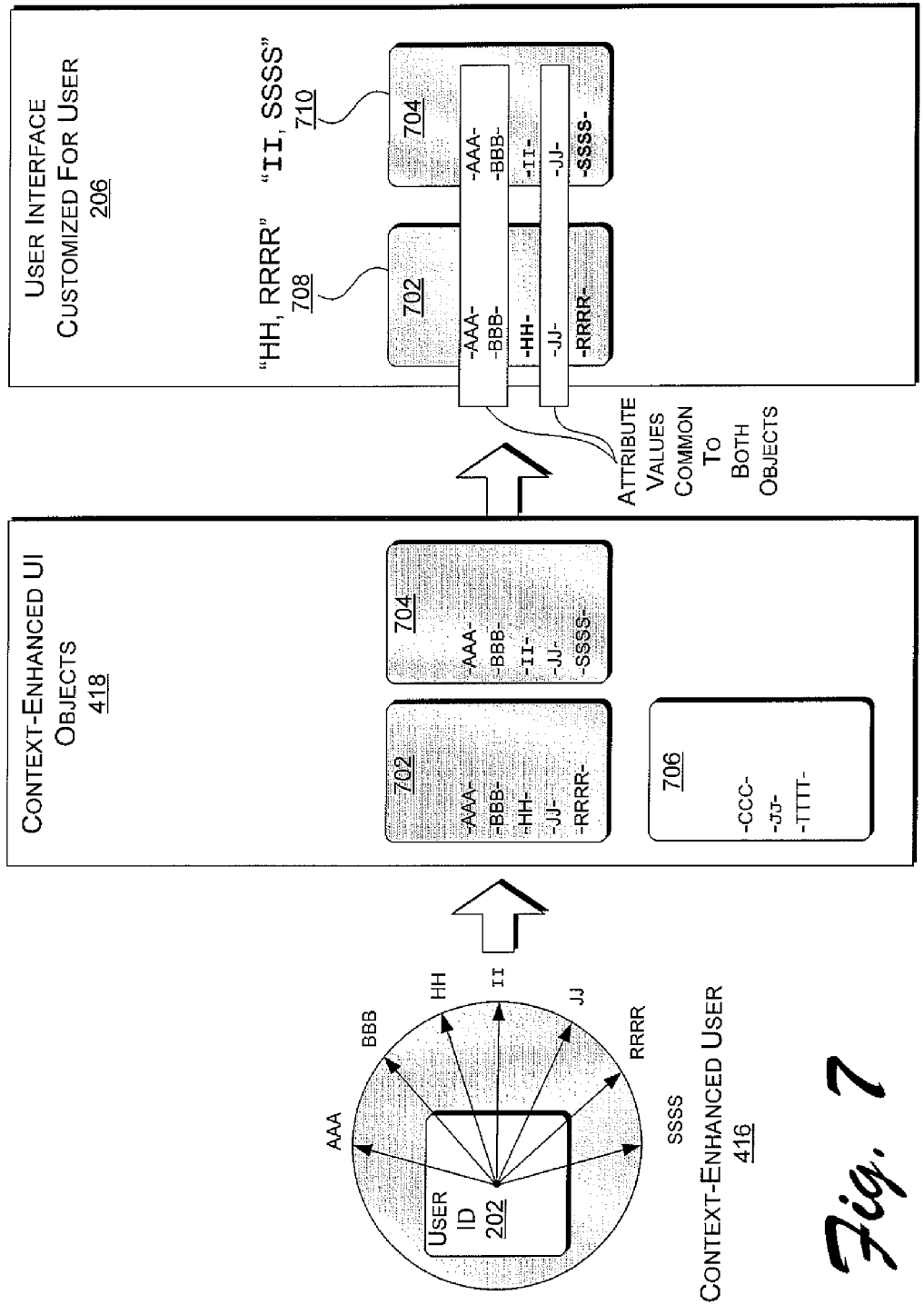
FIG. 7 is a diagram of an exemplary schema for uniquely naming user interface objects with many attributes with respect to the context of a given user.

FIG. 7 is a diagram of an exemplary schema for uniquely naming and/or indexing user interface objects (e.g., 702 and 704) with respect to the context of a given user, especially when the user interface objects have many attributes.

In this example, three types of attributes are used to illustrate the schema. A different number of attributes could have been used instead of three. Generic symbols are used for the attribute types and the allowed values: attribute type "A" has allowable values of "aaa," "bbb," and "ccc." Attribute type "B" has allowable values of "hh," "ii," and "jj." Attribute type "C" has allowable values of "qqqq," "rrrr," "ssss," "tttt." Combinations of these attribute values can be used to compose a user's context and can be assigned to objects displayable in a user interface.

A particular context-enhanced user 416 has a context composed of attribute values "aaa," "bbb," "hh," "ii," "jj," "rrrr," and "ssss." A simple library of context-enhanced user interface objects 418 includes objects 702, 704, and 706. In this example, all the attribute values of object 702 match attribute values within the context of the context-enhanced user 416, so object 702 is included in the user interface customized for the user 206. Likewise, all the attribute values of object 704 match attribute values within the context of the context-enhanced user 416, so object 704 is also included in the user interface customized for the user 206. Object 706, however, has attribute value "ccc" which is not included in the user's context. Therefore object 706 does not appear in the user interface customized for the user 206.

Object 702 and object 704 each have attribute values that are common to both objects (702 and 704), that is, attribute values "aaa," "bbb," and "jj" are common to both objects. Since object 702 and object 704 constitute the entire set of objects to be displayed in the customized user interface 206, in one implementation object 702 can be referred to by its shortened context "hh, rrrr" 708 and object 704 can be referred to by its shortened context "ii, ssss" 710 (effectively dropping "aaa," "bbb," and "jj" because they are identical across all objects in the set of objects to be displayed).

The attribute values that the qualifying objects 702 and 704 do not share in common with each other can be used as unique display names and for differentiating the objects from each other. This is especially useful when an object is very complex with multiple attributes and values. For example, the two objects "Map for International Airline Routes—Passenger" and "Map for International Airline Routes—Cargo" may have numerous identical attribute values, but may be indexed or retrieved via the passenger or cargo attribute values, when such are the only attribute values that differ between the two objects.

In one implementation, the shortened contexts of objects in a display set are dynamic. If an additional object later qualifies for inclusion in the customized user interface 206, this additional object may lack one of the attribute values that was previously common to all objects in the set of objects to be displayed. The previously, but no longer common attribute value then becomes part of the shortened context or unique display name of each object in the display set of objects.

Exemplary Method

Figure 8:
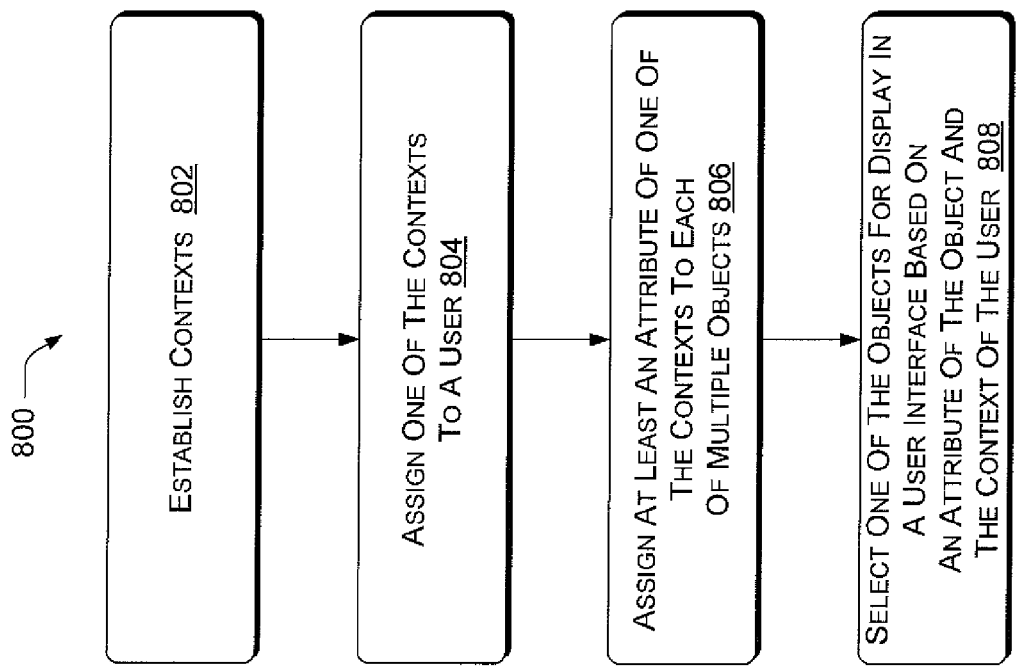
FIG. 8 is a flow diagram of an exemplary method of user interface customization.

FIG. 8 depicts an exemplary method 800 of customizing user interfaces. In the flow diagram, the operations are summarized in individual blocks. The operations may be performed by hardware, software, or combinations of both, for example, by components of an exemplary UI customization engine 312.

At block 802, various contexts are established. In one implementation, a context is a multidimensional classification by attributes. Thus, establishing a context includes selecting a number of dimensions, each dimension described by an attribute. Attribute types are unlimited, but are typically selected to categorize users and/or the objects that various categories of users would receive in a UI customized for their category. A context is thus made up of a selection of attributes and values for the attributes.

At block 804, one of the contexts established at block 802 is assigned to each user capable of receiving a customized UI, e.g., by an exemplary context engine 406. In one implementation, a context specifier 424 is used to define contexts. Alternatively, some systems may use at least some pre-defined contexts that are recognized across a system, in which case a context may be represented by a context identifier that may represent a consistent set of attribute type/value pairs across the system. In yet another implementation, a user's context can be matched on the fly with the attribute type/ values pairs of objects that are to appear in a customized UI 206, without using a context identifier as intermediary. Since there is no limit to the number of contexts that can be used in an exemplary system and no limit to the number of dimensions for each context, the variety of users classified by context is flexible and scalable.

At block 806, at least an attribute of one of the contexts established at block 802 is assigned to each object capable of participating in a customized UI. In one implementation, the same contexts that are assigned to users can be assigned to candidate objects for a customized UI. Context-enhanced objects may be stored in a database for selection and display in a customized UI, or may be queued up according to common contexts to streamline processing during execution of the method 800.

At block 808, objects are selected for inclusion in a customized UI based on at least one attribute type/attribute value pair and the context of the user. The selection may be accomplished by components of an exemplary UI customization engine 312, such as a UI agent 420, an object filter 208, a context specifier 424, etc. In one implementation, objects are selected for inclusion if they possess all the attributes and corresponding attribute values of the context of the user for whom the customized UI is being assembled.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
    assigning one of multiple contexts to each user of a computing system, wherein each context comprises multiple dimensions, each dimension including an attribute type capable of association with one or more values;
    assigning at least one of the attribute types to each of multiple objects selectable for inclusion as part of a user interface of the computing system, each attribute type having an associated value; and
    selecting one or more of the objects to customize the user interface alonn multiple dimensions for a particular user by comparing the attribute values of each object with the attribute values of the particular user;
    wherein when one of the objects has an attribute value that does not match an attribute value of the particular user then the object is not used to customize the user interface; and
    wherein when multiple objects qualify for inclusion in the user interface by having attribute values that match some of the attribute values of the user while also including attribute values that the multiple objects do not share in common with each other, then the multiple objects are each indexed for access via the attribute values that the multiple objects do not share in common with each other, and wherein indexing based on the attribute values that the multiple objects do not share in common facilitates retrieval of each of the multiple objects based on attribute values which are unique to that object.

2. The method as recited in claim 1, wherein the multiple objects that qualify for inclusion in the user interface are differentiated from each other via the attribute values that the multiple objects do not share in common with each other.

3. The method as recited in claim 1, further comprising using the attribute values that the multiple objects do not share in common with each other as unique display names for the multiple objects.

4. The method as recited in claim 1, further comprising retrieving the multiple objects for display, wherein each object is retrieved by a name of a shortened context comprising the attribute values that the multiple objects do not share in common with each other.

5. The method as recited in claim 1, further comprising retrieving the multiple objects for display, wherein each object is retrieved by a name of a shortened context comprising the attribute values that the multiple objects do not share in common with each other, wherein the shortened context of objects in a display set are dynamic, and wherein when an additional object later qualifies for inclusion in the user interface, the additional object can lack one of the attributes values that was previously common to all objects in the display set.

* * * * *

UNITED STATES PATENT AND TRADEMARK OFFICE
CERTIFICATE OF CORRECTION

PATENT NO. : 7,457,814 B2  
APPLICATION NO. : 11/421037  
DATED : November 25, 2008  
INVENTOR(S) : Zoe M. Wydroug et al.

Page 1 of 1

It is certified that error appears in the above-identified patent and that said Letters Patent is hereby corrected as shown below:

In column 11, line 37, in Claim 1, delete "alonn" and insert -- along --, therefor.

In column 12, line 1, in Claim 1, delete "aftribute" and insert -- attribute --, therefor.

Signed and Sealed this

Twenty-sixth Day of April, 2011

David J. Kappos
*Director of the United States Patent and Trademark Office*